(12) United States Patent
Lu et al.

(10) Patent No.: US 10,313,126 B2
(45) Date of Patent: Jun. 4, 2019

(54) BARCODE SECURITY AUTHENTICATION METHOD

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

(*) Notice: Subject to any disclaimer, the term of this patent is extended or adjusted under 35 U.S.C. 154(b) by 56 days.

(21) Appl. No.: 15/580,063

(22) PCT Filed: Jun. 8, 2016

(86) PCT No.: PCT/CN2016/085200
§ 371 (c)(1),
(2) Date: Dec. 6, 2017

(87) PCT Pub. No.: WO2016/197934
PCT Pub. Date: Dec. 15, 2016

(65) Prior Publication Data
US 2018/0302221 A1   Oct. 18, 2018

(30) Foreign Application Priority Data

Jun. 10, 2015 (CN) .......................... 2015 1 0316336

(51) Int. Cl.
*H04L 29/00* (2006.01)
*H04L 9/32* (2006.01)
(Continued)

(52) U.S. Cl.
CPC .............. *H04L 9/3213* (2013.01); *G09C 5/00* (2013.01); *H04L 9/321* (2013.01); *H04L 9/3271* (2013.01);
(Continued)

(58) Field of Classification Search
CPC . H04L 9/3213; H04L 63/0853; H04L 9/3271; H04W 12/06
See application file for complete search history.

(56) References Cited

FOREIGN PATENT DOCUMENTS

CN   104394001 A  *  3/2015
EP      2765531 B1 *  5/2016  ............... G06K 5/00
(Continued)

OTHER PUBLICATIONS

QR-TAN: Secure Mobile Transaction Authentication, published 2009 (Year: 2009).*

*Primary Examiner* — Jeffrey C Pwu
*Assistant Examiner* — Helai Salehi
(74) *Attorney, Agent, or Firm* — Hammer & Associates, P.C.

(57) ABSTRACT

A barcode security authentication method. The method comprises: when a barcode acquisition request from an application server is received by an authentication server, same generates barcode information and returns the barcode information to the application server, where the barcode information is used for displaying a barcode image; a mobile terminal token end acquires the barcode information on the basis of the barcode image, generates a user mobile terminal token response value on the basis of the barcode information and of user mobile terminal token information of self, and directly transmits the user mobile terminal token response value to the authentication server for authentication. The present invention implements the technical effects in which the degree of security of identity authentication is increased while identity authentication is made more convenient and easier to operate.

30 Claims, 2 Drawing Sheets

Figure 1:
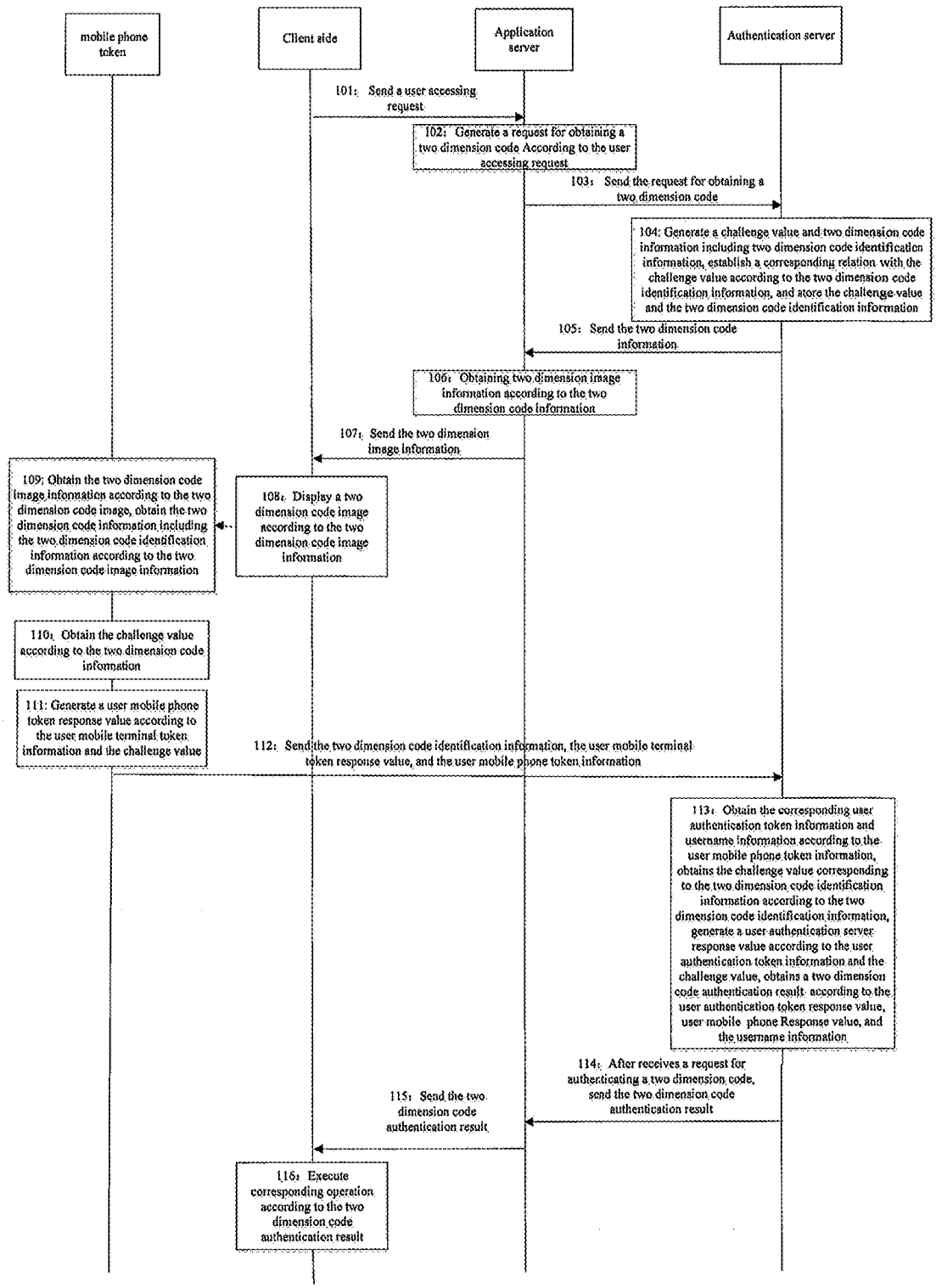

(51) Int. Cl.
*H04L 29/06* (2006.01)
*H04W 12/06* (2009.01)
*G09C 5/00* (2006.01)
*H04W 12/00* (2009.01)

(52) U.S. Cl.
CPC .......... *H04L 63/0853* (2013.01); *H04L 63/18* (2013.01); *H04W 12/00502* (2019.01); *H04W 12/00522* (2019.01); *H04W 12/06* (2013.01)

(56) References Cited

FOREIGN PATENT DOCUMENTS

| | | | | |
|---|---|---|---|---|
| EP | 2765531 | B1 | 5/2016 | |
| EP | 2689386 | B1 * | 7/2018 | ............. G06Q 30/06 |
| WO | WO-2010116109 | A1 * | 10/2010 | ........... H04L 9/3215 |
| WO | WO-2011138558 | A2 * | 11/2011 | ............... G09C 5/00 |

* cited by examiner

BARCODE SECURITY AUTHENTICATION METHOD

FIELD OF THE INVENTION

The present invention relates to a security authenticating method of two dimension code, and can be applied in systems comprising a mobile phone or a computer token side, a client side, an application server, and an authentication server, relating to the field of information security technique.

The term "mobile terminal token" is a mobile phone token, for example.

The so called "mobile terminal" comprises a mobile device such as mobile phone, iPad, etc.

PRIOR ART

Identity authentication technique is an authentication method for verifying a legitimate identity operator on the internet, configured to assure the operator operating with digital identity is the legitimate possessor of the number identity. Identity authentication technique comprises several forms comprising static password, password sent by short message service and dynamic password, etc. Among all, with the development of mobile internet, One Time Password is widely applied in fields such as enterrises, online games, finance as one of identity authentication techniques.

In the prior art, during the process of authenticating identity with one time password, it's necessary for users to input one time password by hand, which is too complex and has risk in security.

SUMMARY OF THE INVENTION

The object of the present invention is to provide a security authenticating method of two dimension code, which can solve the problem of complexity and security risks of authenticating in the process of verifying identity with one time password, and can realize such a technical effect that while identity authentication becomes more convenient and easier to operate, the safety of identity authentication is also enhanced.

Therefore, according to one aspect of the present invention, there is provided a two dimension code security authenticating method, which comprises:

Step S1: receiving, by the application server, a user accessing request through the client side, generating a request for obtaining a two dimension code, sending the request for obtaining a two dimension code to the authentication server;

Step S2: generating, by the authentication server, a challenge value, generating two dimension code information, comprising two dimension code identification information by the two dimension code information, establishing a corresponding relationship with the challenge value according to the two dimension code identification information, storing the challenge value and the two dimension code identification information, and sending the two dimension code information to the application server;

Step S3: obtaining, by the application server, two dimension code image information according to the two dimension code information, displaying two dimension code image, by the client side according to the two dimension code image information;

Step S4: obtaining, by the mobile terminal token, two dimension code image information according to the two dimension code image, obtaining two dimension code information according to the two dimension code image information, comprising two dimension code identification information by the two dimension code information, obtaining a challenge value according to the two dimension code information, generating a user mobile terminal token response value according to the user mobile terminal token information of the mobile terminal token and the challenge value, sending the two dimension code identification information, user mobile terminal token response value, and user mobile terminal token information to the authentication server;

Step S5: obtaining, by the authentication server, the corresponding user authentication token information and username information according to the user mobile terminal token information, obtaining the challenge value corresponding to the two dimension code information according to the two dimension code identification information, generating a user authentication token response value according to the user authentication token information and the challenge value, obtaining a two dimension code authentication result according to the user authentication token response value, the user mobile terminal token response value and the username information;

Step 6: receiving, by the authentication server, the request for authenticating a two dimension code from the application server, sending the two dimension code authentication result to the application server; and Step 7: returning, by the application server, the user accessing result to the client side according to the two dimension code authentication result;

after the Step S3 and before the Step S4, the method also comprises:

receiving, by the application server, a request for authenticating a two dimension code through the client side, sending the request for authenticating a two dimension code to the authentication server.

According to another aspect of the present invention, there is provided a two dimension code security authenticating method, which specifically comprises:

Step A1: receiving, by the application server, the user accessing request including username information through the client side, determining whether the user accessing request is legitimate, if yes, generating a request for obtaining a two dimension code including username information according to the user accessing request, sending the request for obtaining a two dimension code to the authentication server; otherwise, returning error message to the client side;

Step A2: obtaining, by the authentication server, the username information according to the request for obtaining a two dimension code, generating a challenge value, generating two dimension code information, the two dimension code information comprises two dimension code identification information, establishing a corresponding relationship with the username information and the challenge value respectively according to the two dimension code identification information, storing two dimension code identification information, the username information, and the challenge value, and sending the two dimension code information to the application server;

Step A3: obtaining, by the application server, two dimension code image information according to the two dimension code information, sending the two dimension code image information to the client side, displaying, by the client side, two dimension code image according to the two dimension code image information;

Step A4: obtaining, by the mobile terminal token, two dimension code image information according to the two dimension code image, obtaining two dimension code information according to the two dimension code image information, the two dimension code information comprises two dimension code identification information, obtaining a challenge value according to the two dimension code information, generating a user mobile terminal token response value according to the user mobile terminal token information of the mobile terminal token and the challenge value, sending the two dimension code identification information and the user mobile terminal token response value to the authentication server;

Step A5: obtaining, by the authentication server, the challenge value and the username information which are corresponding to the two dimension code identification information according to the two dimension code identification information, obtaining user authentication token information according to the username information, generating a user authentication token response value according to the user authentication token information and the challenge value, obtaining the two dimension code authentication result according to the user authentication token response value, user mobile terminal token response value and the username information;

Step A6: after receiving, by the authentication server, the request for obtaining a two dimension code from the application server, sending the two dimension code authentication result to the application server; and Step A7: returning, by the application server, the user accessing result to the client side according to two dimension code authentication result;

after the Step A3 and before the Step A6, the method also comprises:

receiving, by the application server, a request for authenticating a two dimension code through the client side, sending the request for authenticating a two dimension code to the authentication server.

According to the other aspect of the present invention, there is provided a two dimension code security authenticating method, which specifically comprises:

Step T1: receiving, by the authentication server, the request for authenticating a two dimension code from the application server, generating a challenge value, generating two dimension code information, the two dimension code information comprises two dimension code identification information, establishing a corresponding relationship with the challenge value according to the two dimension code identification information, storing the challenge value and the two dimension code identification information, and sending the two dimension code information to the application server, the two dimension code information is configured to display a two dimension code image;

Step T2: receiving, by the authentication server, the two dimension code identification information, user mobile terminal token response value, and user mobile terminal token information from a mobile terminal token, obtaining the user authentication token information and username information which are corresponding to the user mobile terminal token information according to the user mobile terminal token information, obtaining the challenge value corresponding to the two dimension code information according to the two dimension code identification information, generating a user authentication token response value according to the user mobile terminal token information and the challenge value, obtaining result of two dimension code information authentication according to the user authentication token response value, the user mobile terminal token response value, and the username information;

Step T3: after receiving, by the authentication server, the request for authenticating a two dimension code from the application server, sending the two dimension code authentication result to the application server;

after the Step T1 the method further comprises: receiving, by the authentication server, the request for authenticating a two dimension code from the application server.

According to the other aspect of the present invention, there is provided a two dimension code security authenticating method, which specifically comprises:

Step W1: receiving, by the authentication server, the request for authenticating a two dimension code including username information from the application server, generating a challenge value, generating two dimension code information, the two dimension code information comprises two dimension code identification information, establishing a corresponding relationship with the username information and the challenge value respectively according to the two dimension code identification information, storing two dimension code identification information, the username information and the challenge value, returning the to the application server, the two dimension code information is configured to display an two dimension code image;

Step W2: receiving, by the authentication server, the two dimension code identification information and the user mobile terminal token response value from the mobile terminal token, obtaining the challenge value and the username information which are corresponding to the two dimension code identification information according to the two dimension code identification information, obtaining user authentication token information according to the username information, generating a user authentication token response value according to the user authentication token information and the username information, obtaining the two dimension code authentication result according to the user authentication token response value, the user mobile terminal token response value, and the username information; and Step W3: after receiving, by the authentication server, the request for authenticating a two dimension code from the application server, sending the two dimension code authentication result to the application server;

after the Step W1 the method also comprises: receiving, by the request for authenticating a two dimension code from the application server.

According to the present invention, the mobile terminal token generates a, user mobile terminal token response value according to the two-dimensional bar image and the user mobile terminal token information itself, and directly sends the user mobile terminal token response value to the authentication server for authenticating.

According to the present invention, while identity authentication becomes more convenient and easier to operate, the safety of identity authentication is also enhanced.

BRIEF DESCRIPTION OF ACCOMPANYING DRAWINGS

Figure 2:
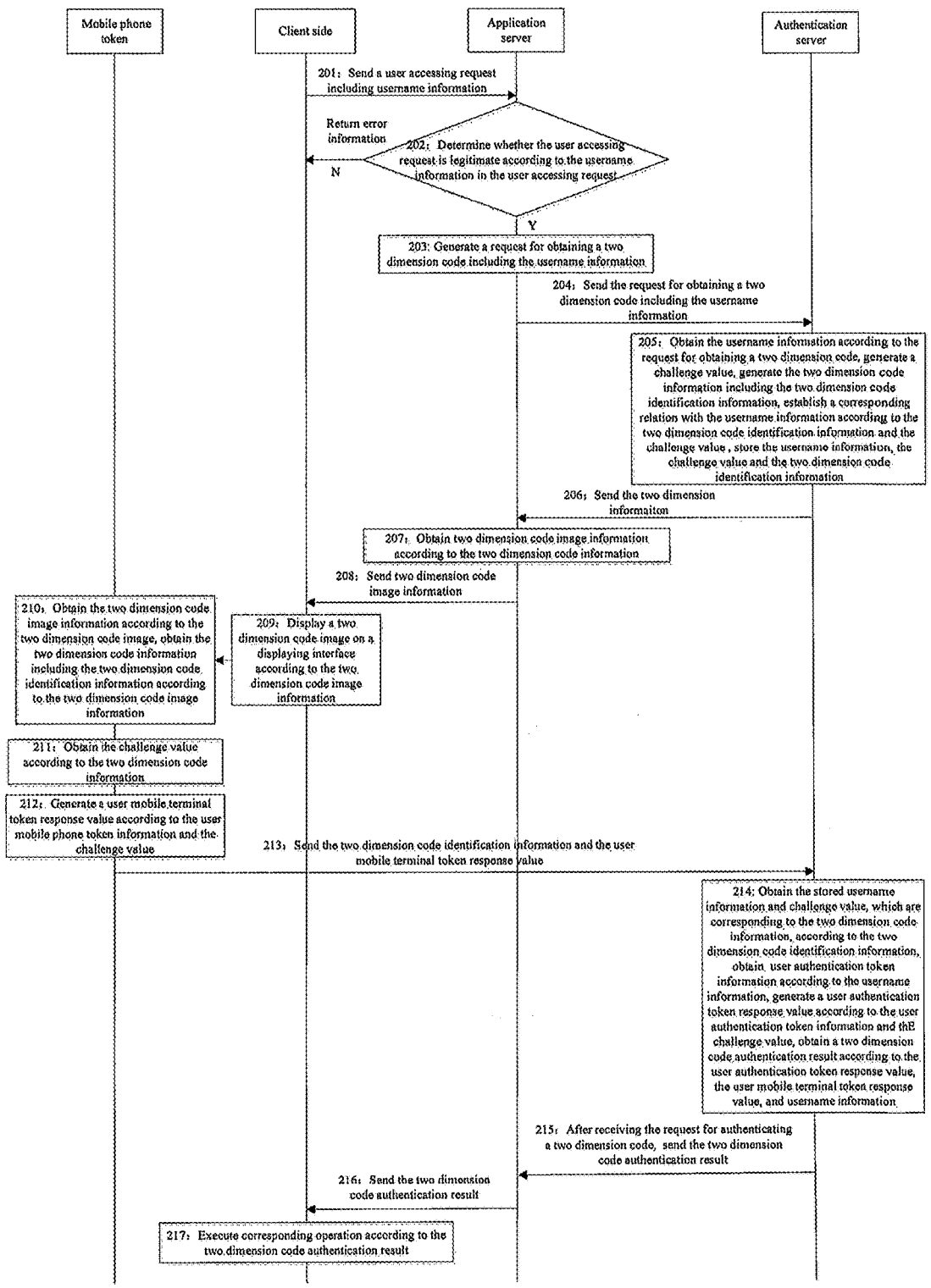

FIG. 1 provides a flow chart of a security authenticating method of two dimension code according to Embodiment 1 of the present invention; and FIG. 2 provides a flow chart of a security authenticating method of two dimension code according to Embodiment 1 of the present invention.

DETAILED DESCRIPTION OF THE INVENTION

The technical solution in the embodiments of the present invention is further described more clearly and completely with the drawings of the present invention. Apparently, Embodiments described herein are just a few embodiments of the present invention. On the basis of embodiments of the invention, all other related embodiments made by those skilled in the art without any inventive work belong to the scope of the invention.

It should be noted that in the present invention, user authentication token information is distributed by an authentication server, the authentication server can at least distribute a piece of user authentication token information corresponding to a piece of username information according to the username information, each piece of user authentication token information comprises a piece of user authentication token serial numbers and a corresponding user authentication token seed, each piece of user authentication token serial numbers and the corresponding user authentication token seed is unique, and a corresponding mobile terminal token (e.g. mobile phone token) also stores user mobile terminal token serial numbers in accordance with the user authentication token serial numbers, and the user mobile terminal token seed in accordance with the user mobile terminal token seed.

For instance, User1 corresponds to three mobile terminal token information, User1 $1^{st}$ authentication token information, User 1 $2^{nd}$ authentication token information, and User1 $3^{rd}$ authentication token information. User 1 $1^{st}$ authentication token information comprises a User1 $1^{st}$ authentication token serial number and a corresponding User1 $1^{st}$ authentication token seed; User1 $2^{nd}$ authentication token information comprises a User1 $2^{nd}$ authentication token serial number and a corresponding User1 $2^{nd}$ authentication token seed; User1 $3^{rd}$ authentication token information comprises a User1 $3^{rd}$ authentication token serial number and a corresponding User1 $3^{rd}$ authentication token seed, etc.

User2 corresponds a user authentication token information, User2 $1^{st}$ authentication token information. User2 $1^{st}$ authentication token information comprises: a User2 $1^{st}$ authentication token serial number and a corresponding User2 $1^{st}$ authentication token seed.

Embodiment 1

Embodiment 1 of the present invention provides a security authenticating method of two dimension code, which can be applied in a system comprising a mobile terminal token, a client side, an application server and an authentication server, in Embodiment 1, the mobile terminal token possesses a function of collecting two dimension code. As shown in FIG. 1, the specific steps are as below:

Step 101: the client side sends a user accessing request to the application side;

in Embodiment 1, the client side can be but not limited to a PC.

In Embodiment 1, a user accessing request can be a user logging accessing request, etc.

Step 102: the application server generates a request for obtaining a two dimension code; in Embodiment 1, the request for obtaining a two dimension code can also comprise an application identification.

Step 103: the application server sends the request for obtaining a two dimension code to the authentication server;

specifically, the application server sends the request for obtaining a two dimension code to the authentication server through an authentication proxy.

in Embodiment 1, the application server and the authentication server communicate with each other through the authentication proxy.

Step 104: the authentication server generates a challenge value and two dimension code information including two dimension code identification information, establishes a corresponding relationship with the challenge value according to the two dimension code identification information, and stores the challenge value and the two dimension code identification information;

specifically, after the authentication server receives the request for obtaining a two dimension code, generates a challenge value and two dimension code identification information, obtains two dimension code information including the two dimension code identification information according to the two dimension code identification information, establishes a corresponding relationship between the two dimension code identification information and the challenge value, stores the two dimension code identification information and the challenge value.

In Embodiment 1, two dimension code can be the form of URL (Uniform Resource Locator).

The two dimension code identification information in Embodiment 1, is the identification information of two dimension code information. In Embodiment 1, the two dimension code identification information can be but not limited to username information or user mobile terminal token serial numbers or reqid information (request ID number) generated according to random numbers. To better enhance the security of authentication, decrease the possibility that user-related username information or information such as user mobile terminal token serial numbers is leaked, preferably, the two dimension code identification information can be reqid information (request ID number) generated according to random numbers. For instance, two dimension code identification information can be 53fdd6ed-8cfc-4bd1-8186-4a7d19640c4b.

In Embodiment 1, the authentication server can generate a challenge value according to a first preset algorithm, but also can generate a challenge value according to random numbers.

In Embodiment 1, a first preset algorithm can be GM algorithm, OAth algorithm, etc.

Step 105: the authentication server sends two dimension code information to the application server;

Step 106: the application server obtains two dimension code image information according to two dimension code information;

specifically, according to two dimension code information, the application server according to internal logic binary to encode, display two dimension code image information by several geometry images corresponding to binary.

Step 107: the application server, sends the two dimension code image information to the client side;

Step 108: the client side displays a two dimension code image according to the two dimension code image information;

specifically, the client side displays a two dimension code image on a displaying interface according to the two dimension code image information;

Step 109: the mobile terminal token obtains the two dimension code image information according to the two dimension code image, obtains the two dimension code information including the two dimension code identification information according to the two dimension code image information.

specifically, the mobile terminal token can but not limited obtains two dimension code image information through scanning two dimension code image.

Step 110: the mobile terminal token obtains the challenge value according to the two dimension code information;

this step 110 specifically includes:

Step 110-1: the mobile terminal token generates a request for obtaining a challenge value according to the two dimension code information, sends the request for obtaining a challenge value to the authentication server according to the two dimension code information;

specifically, the mobile terminal token, sends the request for obtaining a challenge value including two dimension code identification information to the authentication server according to the preset authentication server address.

Step 110-2: the authentication server obtains the challenge value corresponding to the two dimension code information, according to the request for obtaining a challenge value, sending the challenge value to the mobile terminal token.

specifically, the authentication server obtains the challenge value corresponding to the two dimension code identification information according to the two dimension code identification information in the request for obtaining a challenge value, returning the challenge value to the mobile terminal token through the corresponding communication channel established by the mobile terminal token according to the preset authentication server address.

Step 111: the mobile terminal token generates a user mobile terminal token response value according to user mobile terminal token information and the challenge value;

specifically, the mobile terminal token calculates the challenge value, user mobile terminal token seed, and a dynamic factor according to a $2^{nd}$ preset algorithm to generate a user mobile terminal token response value; the dynamic factor is a time factor and/or an event factor.

In Embodiment 1, the mobile terminal token at least includes a piece of user mobile terminal token information, the user mobile terminal token information includes user mobile terminal token seed and the corresponding user mobile terminal token serial numbers. When the mobile terminal token includes multiple user mobile terminal token information, mobile terminal token can obtain user mobile terminal token information chosen externally. For instance, obtaining user mobile terminal token information chosen by an external user.

Step 112: the mobile terminal token sends the two dimension code identification information, the user mobile terminal token response value, and the user mobile terminal token information to the authentication server;

specifically, the mobile terminal token sends the two dimension code identification information, the user mobile terminal token response value, and user mobile terminal token serial numbers to the authentication server according to the preset authentication server address.

Step 113: the authentication server obtains the corresponding user authentication token information and username information according to the user mobile terminal token information, obtains the challenge value corresponding to the two dimension code identification information according to the two dimension code identification information, generates a user authentication server response value according to the user authentication token information and the challenge value, obtains a two dimension code authentication result according to the user authentication token response value, the user mobile terminal token response, and the username information.

specifically, the authentication server obtains the user authentication token seed and the username information which are corresponding to a user mobile terminal token serial numbers according to the user mobile terminal token serial numbers, obtains the challenge value corresponding to the two dimension code identification information according to the two dimension code identification information, generates a user authentication token response value by calculating the user authentication token seed, challenge value, and dynamic factor according to the algorithm same as the $2^{nd}$ preset algorithm, obtains a two dimension code authentication result according to the user authentication token response, the user mobile terminal token response value, and the username information.

Step 114: after the authentication server receives a request for authenticating a two dimension code, sends the two dimension code authentication result to the application server;

specifically, after the authentication server receives a request for authenticating a two dimension code, the authentication server sends the two dimension code authentication result to the application server.

In Embodiment 1, after Step 108 and before Step 114, the embodiment further includes:

Step b1: the client side generates a request for authenticating a two dimension code according to the two dimension code image information;

specifically, the client side obtains two dimension code identification information in the two dimension code information according to the two dimension code image information, generates the request for authenticating a two dimension code including the two dimension code identification information.

It should be noted that, the client side can generates the request for authenticating a two dimension code according to the two dimension code image information when receiving trigger of users; but can also generates the request for authenticating a two dimension code in Step 108 when the client side displays two dimension code image on displaying interface according to the two dimension code image information.

Step b2: the client side sends a request for authenticating a two dimension code to the application server; and Step b3: the application server sends a request for authenticating a two dimension code to the authentication server.

Step 114 specifically includes:

the authentication server determines whether a legitimate request for authenticating a two dimension code is obtained in the preset time, if yes, sends a two dimension code authentication result to the application server; otherwise, regards the information of two dimension code authentication failure as the two dimension code authentication result, and sends the two dimension code authentication result to the application server;

specifically, the authentication server determines whether legitimate two dimension code identification information from the mobile terminal token is obtained in the preset time according to the two dimension code identification information in the request for authenticating a two dimension code, the authentication server determines whether the request for authenticating a two dimension code from the mobile terminal token in the preset time includes the corresponding two dimension code identification information, if yes, determines that a legitimate request for authenticating a two dimension code is received; otherwise, determines that a legitimate request for authenticating a two dimension code is not received, and regards the information of two dimension code authentication failure as the two dimension code authentication result.

In Embodiment 1, preferably, the preset time is 60 s.

Step 115: the application server sends the two dimension code authentication result to the client side;

Step 116: the client side executes corresponding operations according to the two dimension code authentication result.

In Step 116, the client side can also waits for receiving the two dimension code authentication result in the preset time, if the two dimension code authentication result is obtained, then executes the corresponding operations according to the two dimension code authentication result; otherwise, output the information of accessing failure.

In Embodiment 1, when the user accessing request is a user logging accessing request, the client side displays a user logging result according to the two dimension code authentication result received, if information of two dimension code authentication success is received, then skips to the application server interface after user logging, if information of two dimension code authentication failure is received, then output the information of user logging failure.

In Embodiment 1, the two dimension code information can also include a challenge value.

When the two dimension code information specifically includes two dimension code identification information and a challenge value, Step 104 can specifically include:

after receiving a request for authenticating a two dimension code, the authentication server generates a challenge value and two dimension code identification information, obtains two dimension code information including the challenge value and the two dimension code identification information according to the two dimension code identification information, establishes corresponding relationship between the two dimension code identification information and the challenge value, and stores the two dimension code identification information and the challenge value.

correspondingly, Step 110 can further specifically include:

the mobile terminal token obtains the challenge value in the two dimension code information.

In Embodiment 1, in Step 113, after the authentication server obtains the challenge value corresponding to the two dimension code identification information according to the two dimension code identification information, before generating a user authentication token response value according to the user authentication token information and the challenge value, the Step 113 further includes:

the authentication server determines whether the challenge value corresponding to the two dimension code identification information is obtained, if yes, then generates a user authentication token response value according to the user authentication token information and the challenge value; otherwise, regards the information of two dimension code authentication failure as the two dimension code authentication result, executing the Step 114;

correspondingly, in Step 104 when the authentication server receives the request for obtaining a two dimension code, or in Step 113 after the authentication server receives the challenge value, the authentication server further includes, deleting the two dimension code identification information and the challenge value which have been stored.

In Embodiment 1, the two dimension code information can include an authentication server address;

when the two dimension code information specifically includes an authentication server address and two dimension code identification information, Step 104 can specifically include that:

after receiving a request for obtaining a two dimension code, the authentication server generates a challenge value and two dimension code identification information, obtains the two dimension code information including two dimension code identification information and the authentication server address according to the two dimension code identification information and the authentication server address of itself, establishes a corresponding relationship between the two dimension code identification information and the challenge value, and stores the challenge value and the two dimension code identification information.

Two dimension code can be the form of URL (Uniform Resource Locator), for instance: scanauth://api-dfserv.cloudentify.com:1851/53fdd6ed-8cfc-4bd1-8186-4a7d19640c4b, in which, api-dfserv.cloudentify.com:1851 is the address of the authentication server, mobile terminal token can establish a communication channel with the authentication server according to the authentication server address, 53fdd6ed-8cfc-4bd1-8186-4a7d19640c4b is the two dimension code identification information.

correspondingly, Step 110 specifically includes: the mobile terminal token obtains a challenge value according to the two dimension code identification information of the two dimension code information and the authentication server address;

Step 112, specifically includes: the mobile terminal token sends the two dimension code identification information, the user mobile terminal token side response value, and the user mobile terminal token information to the authentication server according to the authentication server in the two dimension code information.

In Embodiment 1, the request for obtaining a two dimension code can include: an application identification;

when the request for obtaining a two dimension code includes an application identification, Step 104 further includes: the authentication server obtains an application name according to the application identification, establishes a corresponding relationship with the application name, storing the application name;

correspondingly, before Step 111 the method can further include: the mobile terminal token obtains the application name according to the two dimension code information; obtains the username information according to the user mobile terminal token information of the mobile terminal token, correspondingly, Step 110 can further specifically includes:

Step 110': the mobile terminal token obtains the username information corresponding to the user mobile terminal token information and the application name as well as the challenge value corresponding to the two dimension code information according to the two dimension code information and the user mobile terminal token information of the mobile terminal token, displays the username information and the application name, then waits for obtaining authentication information.

Step 110' specifically includes:

Step a1: the mobile terminal token generates the request for obtaining a challenge value and user application information according to the two dimension code identification information and the user mobile terminal token information in the two dimension code information, sending the request for obtaining a challenge value and user application information to the authentication server.

Specifically, the mobile terminal token sends the request for obtaining a challenge value and user application information, which including the two dimension condi identification information and the user mobile terminal token sequence number, according to a preset authentication server address.

Step a2: the authentication server obtains the challenge value and the application name correspondingly to the two dimension code identification information according to the request for obtaining a challenge value and user application information, obtains the username information corresponding to the user mobile terminal token information, returns the challenge value, the username information and the application name to the mobile terminal token.

Specifically, the authentication server obtains the challenge value and the application name correspondingly to the two dimension code identification information according to the two dimension code identification information in the request for obtaining a challenge value and user application information, obtains the username information corresponding to the user mobile terminal token serial numbers according to the user mobile terminal token serial numbers in the request for obtaining a challenge value and user application information, returns the challenge value to the mobile terminal token through the communication channel established according to the preset authentication server address.

Correspondingly, Step 111 specifically includes:

after obtaining the authentication information and the challenge value, generates the user mobile terminal token response value according to the user mobile terminal token information of the mobile terminal token.

In Embodiment 1, the user accessing request can include a username information, correspondingly, after Step 101 and before Step 102, the method can further include:

the application server determines whether the user accessing request is legitimate, if yes, generates a request for obtaining a two dimension code according to the user accessing request; otherwise, returns error message to the client side.

specifically, the application server determines whether the user accessing request is legitimate according to the username information in the user accessing request, if yes, generates the request for obtaining a two dimension code including the username information according to the user accessing request; otherwise, then returns error message to the client side.

correspondingly, Step 104 further include: the authentication server obtains the username information according to the request for obtaining a two dimension code, establishes a corresponding relationship between the two dimension code identification information and the username information, storing the username information.

It should be noted that, the user accessing request can include username information and user code information, correspondingly, the application server determines whether the user accessing request is legitimate, if yes, generates a request for obtaining a two dimension code according to the user accessing request; otherwise, returns error message to the client side; specifically includes:

the application server determines whether the user accessing request is legitimate according to the username information and the user code information in the user accessing request, if yes, generates the request for obtaining a two dimension code including the username information according to the user accessing request; otherwise, returns error message to the client side.

In Embodiment 1, when the user accessing request include username information, the two dimension code information can further include user authentication token information, correspondingly, Step 104 can specifically include:

after receiving the request for obtaining a two dimension code, the authentication server generates the challenge value and two dimension code identification information, obtains the user authentication token information according to the username information, generates two dimension code information including the two dimension code identification information and the user authentication token information according to the two dimension code identification information and the user authentication token information, establishes a corresponding relationship between the two dimension code identification information and the challenge value, and stores the challenge value and the two dimension code identification information.

Specifically, after receiving the request for obtaining a two dimension code, the authentication server generates the challenge value and two dimension code identification information, obtains the user authentication token serial numbers according to the username information, generates the two dimension code information including the two dimension code identification information and the user authentication serial numbers according to the two dimension code identification information and the user authentication serial numbers, establishes a corresponding relationship between the two dimension code identification information and the challenge value, stores the challenge value and the two dimension code identification information.

Correspondingly, after Step 109 and before Step 110, the method further includes: obtains the user mobile terminal token information of the mobile terminal token according to the user authentication token information in the two dimension code information.

Specifically, obtains the user mobile terminal token information of the mobile terminal token according to the user authentication token serial in the two dimension code information.

Correspondingly, after obtaining the user mobile terminal token information of the mobile terminal token according to the user authentication token information in the two dimension code information, before Step 110, the method furthers includes:

the mobile terminal token determines whether the user mobile terminal token information of the mobile terminal token obtained, if yes, obtains the user mobile terminal token response value according to the user mobile terminal token information and the challenge value; otherwise, returns the error and exits.

Specifically, the mobile terminal token determines whether the user mobile terminal token information of the mobile terminal token which matches to the user authentication serial numbers obtained, if yes, obtains the user mobile terminal token response value according to the user mobile terminal token information and the challenge value; otherwise, returns the error and exits.

It should be noted that, in Embodiment 1, the two dimension code information at least includes the two dimension code identification information, and can further include at least one of the authentication server address, the challenge value, and the user mobile terminal token serial numbers.

Further, it should be noted that, in the present invention, the user mobile terminal token response value is the One Time Password generated by the mobile terminal token.

Embodiment 2

Embodiment 2 of the present invention provides a security authenticating method of two dimension code, which can be applied in a system comprising a token side, a client side, an application server and an authentication server, in Embodiment 2, the mobile terminal token possesses a function of collecting a two dimension code. As shown in FIG. 2, the specific steps are as follows:

Step 201: the client side sends a user accessing request including username information to the application server;

In Embodiment 2, the client side can be a PC.

In Embodiment 2, a user accessing request can be a user logging accessing request, etc.

In Embodiment 2, a user accessing request at least include the username information input by the user, and can further include the user code information corresponding to the username input by the user.

For instance, the username information can be User1, the user code information corresponding to User1 is 123.

Step 202: the application server determines whether the user accessing request is legitimate according to the username information in the user accessing request, if yes, then executes Step 203; otherwise returns error message to the client side;

specifically, the application server obtains the username information in the user accessing request, determines whether the user information matching to the username information have been stored, if yes, determines that the user accessing request is legitimate, otherwise, determines that the user accessing request is illegitimate, returns error message to the client side.

In Embodiment 2, Step 201 can be substituted with Step 201', the corresponding Step 202 can be replaced with Step 202';

Step 201': the client side sends the user accessing request including the username information and the user code information to the application server;

Step 202': the application server determines whether the user accessing request is legitimate according to the username information and the user code information in the user accessing request, if yes, then executes Step 203; otherwise, returns error message to the client side;

specifically, the application server determines whether the user information matching to the username information and the user code information have been stored, if yes, then determines that the user accessing request is legitimate, otherwise, determines that the user accessing request is illegitimate, returns error message to the client side.

Step 203: the application server generates a request for obtaining a two dimension code including the username information;

specifically, the application server regards the username information as the parameter of generating the request for obtaining a two dimension code.

In Embodiment 2, the request for obtaining a two dimension code can further include the application identification itself.

Step 204: the application server sends the request for obtaining a two dimension code including the username information to the authentication server;

specifically, the application server sends the request for obtaining a two dimension code including the username information to the authentication server through an authentication proxy.

In Embodiment 2, the application server and the authentication server communicate with each other through an authentication proxy.

Step 205: the authentication server obtains the username information according to the request for obtaining a two dimension code, generates a challenge value, generates the two dimension code information including the two dimension code identification information, establishes a corresponding relationship with the username information according to the challenge value and the two dimension code identification information, stores the username information, the challenge value and the two dimension code identification information;

In Embodiment 2, the two dimension code information can further include the authentication server address of itself, when the two dimension code information includes the two dimension code identification information and the authentication server address, Step 205 specifically includes:

after receiving the request for obtaining a two dimension code, the authentication server generates the challenge and two dimension code identification information, obtains the two dimension code information including the authentication server address and the two dimension code identification information, establishes a corresponding relationship of the two dimension code identification information between the username information and the challenge value respectively, stores the username information, the challenge value and the two dimension code identification information.

In Embodiment 2, the two dimension code information can be the form of URL (Uniform Resource Locator), for instance, scanauth://api-dfserv.cloudentify.com:1851/53fdd6ed-8cfc-4bd1-8186-4a7d19640c4b, in which api-df-serv.cloudentify.com:1851 is the authentication server address, the mobile terminal token can establishes a communication channel with the authentication server to communicate through the authentication server, 53fdd6ed-8cfc-4bd1-8186-4a7d19640c4b is the two dimension code identification information.

The two dimension code identification information in Embodiment 2, is the identification information of the two dimension code information. In the embodiment, the two dimension code identification information can but not limited to be username information or user mobile terminal serial numbers or reqid (request ID) information generated according to random numbers, etc, preferably, to better enhance the security of authentication, the two dimension code identification information can be reqid (request ID) information generated according to random numbers.

In Embodiment 2, the authentication server san generate the challenge value according to a $1^{st}$ preset algorithm, and can also generate the challenge value according to random numbers.

In Embodiment 2, the $1^{st}$ preset algorithm can be GM algorithm, Oath algorithm, etc.

Step 206: the authentication server sends the two dimension code information to the application server;

Step 207: the application server obtains two dimension code image information according to the two dimension code information;

specifically, the application server encode with internal logical binary according to the two dimension code information, display the two dimension code image information by several geometry image corresponding to binary.

Step 208: the application server sends the two dimension code image information to the client side;

Step 209: the client side displays two dimension code image on a displaying interface according to the two dimension code image information.

Step 210: the mobile terminal token obtains the two dimension code image information according to the two dimension code image, and obtains the two dimension code information including the two dimension code identification information according to the two dimension code image information.

Especially, after the mobile terminal token obtains the user mobile terminal token information, the mobile terminal token can obtain but not limited to the two dimension code image information by means of scanning the two dimension code image, and obtains the two dimension code information including the two dimension code identification information according to the two dimension code image information.

Step 211: the mobile terminal token obtains the challenge value according to the two dimension code information;

when the two dimension code information includes the two dimension code identification information and the authentication server address, Step 211 specifically include:

Step 211-1: the mobile terminal token generates a request for obtaining a challenge value according to the two dimension code information, sends the request for obtaining a challenge value to the authentication server according to the two dimension code information;

specifically, the mobile terminal token sends the request for obtaining a challenge value including the two dimension code identification information to the authentication server according to the authentication server address in the two dimension code information.

Step 211-2: the authentication server obtains the stored challenge value corresponding to the two dimension code information according to the request for obtaining a two dimension code, sends the challenge value to the mobile terminal token.

Specifically, the authentication server obtains the stored challenge value corresponding to the two dimension code identification information according to two dimension code identification information in the request for obtaining a challenge value, returns the challenge value to the mobile terminal token through the communication channel established according to the authentication server address.

In Embodiment 2, Step 211 can further be substituted by Step 211';

Step 211': the mobile terminal token obtains the challenge value according to the two dimension code information and the user mobile terminal token information;

Step 211' specifically includes:

Step 211'-1: the mobile terminal token generates a request for obtaining a challenge value according to the two dimension code information and the user mobile terminal token information, sends the request for obtaining a challenge value to the authentication server according to the two dimension code information;

specifically, the mobile terminal token sends the request for obtaining a challenge value including the two dimension code identification information and the user mobile token serial numbers to the authentication server according to the authentication server address in the two dimension code information.

Step 211'-2: the authentication server obtains the stored challenge value and the username information which are corresponding to the two dimension code information according to the request for obtaining a challenge value, determines whether the user mobile terminal token serial numbers matches to the username information, if yes, sends the challenge value to the mobile terminal token, otherwise, returns error message to the mobile terminal token.

Specifically, the authentication server obtains the user mobile terminal token serial numbers and the stored challenge value which are corresponding to the two dimension code identification information according to the two dimension code identification information in the request for obtaining a challenge value, determines whether the user mobile terminal token serial numbers matches to the username information, if yes, returns the challenge value to the mobile terminal token through the communication channel established according to the authentication server address; otherwise, returns error message to the mobile terminal token through the communication channel established according to the authentication server address.

In Embodiment 2, when the request for obtaining a two dimension code includes an application identification, in Step 211, the method can further include that the mobile terminal token obtains the challenge value, username information and the application name according to the two dimension code information, correspondingly, the mobile terminal token obtains the challenge value, username information and the application name according to the two dimension code information, specifically includes:

Step 211-1': the mobile terminal token generates a request for obtaining a challenge value and user application information according to the two dimension code information, sends the request for obtaining a challenge value and user application information to the authentication server according to the authentication server address;

specifically, the mobile terminal token sends the request for obtaining a challenge value and user application information including two dimension code identification information to the authentication server according to the authentication server address in the two dimension code information.

Step 211-2': the authentication server obtains the challenge value, username information and application name which are corresponding to the two dimension code information according to the request for obtaining a challenge value and user application information, returns the challenge value, username information and application name to the application server.

Specifically, the authentication server obtains the challenge value corresponding to the two dimension code identification information according to the two dimension code identification information in the request for obtaining a challenge value and user application information, returns the challenge value to the mobile terminal token through the communication channel established according to the authentication server address.

When the mobile terminal token obtains the challenge value, the username information and application name, waits for authentication message, when obtaining the authentication message, executes Step 212.

Step 212: the mobile terminal token generates a user mobile terminal token response value according to the user mobile terminal token information and the challenge value;

specifically, the mobile terminal token calculates the challenge value, the user mobile terminal token seed and dynamic factor through a $2^{nd}$ preset algorithm to generate the user mobile terminal token response value. The dynamic factor include time factors and/or event factors.

For instance, the mobile terminal token calculates the challenge value, a User $1^{st}$ mobile terminal token seed, and dynamic factor through a $2^{nd}$ preset algorithm to generate User 1 $1^{st}$ mobile terminal token response value information.

In Embodiment 2, the mobile terminal token at least includes a piece of user mobile terminal token information, the piece of user mobile terminal token information includes user mobile terminal token seed and the corresponding user mobile terminal token serial number. When the mobile terminal token includes several pieces of user mobile terminal token information, the mobile terminal token can obtain the user mobile terminal token information chosen by external. For instance, obtains the user mobile terminal token information chosen by an external user.

Step 213: the mobile terminal token sends the two dimension code identification information and the user mobile terminal token response value to the authentication server;

specifically, the mobile terminal token sends the two dimension code identification information and the user mobile terminal token response value to the authentication server according to the authentication server address in the two dimension code information.

Step 214: the authentication server obtains the stored username information and challenge value which are corresponding to the two dimension code information according to the two dimension code identification information, obtains user authentication token information according to the username information, generates a user authentication token response value according to the user authentication token information and the challenge value, obtains a two dimension code authentication result according to the user authentication token response value, user mobile terminal token response value, and username information.

Specifically, the authentication server obtains the stored username information and challenge value which are corresponding to the two dimension code identification information according to the two dimension code identification information, obtains the user authentication token seed according to the username information, calculates the user authentication seed, challenge value and dynamic factor by the algorithm same with a $2^{nd}$ preset algorithm to generate a user authentication token response value, obtains a two dimension code authentication result according to the user authentication token response value, user mobile terminal token response value, and username information, in which, the authentication server obtains the user authentication token information according to the username information, specifically, obtains all user authentication token seed of user authentication token matching to the username information according to the username information;

in which, the authentication server obtains the two dimension code authentication result according to the user mobile terminal token response value, user authentication token response value, and the username information, specifically includes, the authentication server determines whether the user mobile terminal token response value matching to the user authentication token response value exists, if yes, regards the message of two dimension code authentication success as the two dimension code authentication result; otherwise, regards the message of two dimension code authentication failure as the two dimension code authentication result.

For instance, when the user mobile terminal token response value obtained is the User 1 $1^{st}$ mobile terminal token response value information, the authentication server generates a User 1 $1^{st}$ authentication token response value according to the challenge value, User 1 $1^{st}$ authentication token seed and the dynamic factor through the algorithm same with a $2^{nd}$ preset algorithm, determines whether the User 1 $1^{st}$ mobile terminal token response value information matches to User 1 $1^{st}$ authentication token response value, if yes, then determines that the user mobile terminal token response matches to the user authentication token response value, regards the message of two dimension code authentication success as the two dimension code authentication result; otherwise, generates a User 1 $2^{nd}$ authentication token response value according to the challenge value, User 1 $2^{nd}$ authentication token seed and the dynamic factor through the algorithm same with a $2^{nd}$ preset algorithm, determines whether the User 1 $2^{nd}$ mobile terminal token response value information matches to User 1 $2^{nd}$ authentication token response value, if yes, then determines that the user mobile terminal token response matches to the user authentication token response value, regards the message of two dimension code authentication success as the two dimension code authentication result; otherwise, generates a User 1 $3^{rd}$ authentication token response value according to the challenge value, User 1 $3^{rd}$ authentication token seed and the dynamic factor through the algorithm same with a $2^{nd}$ preset algorithm, determines whether the User 1 $3^{rd}$ mobile terminal token response value information matches to User 1 $3^{1d}$ authentication token response value, if yes, then determines that the user mobile terminal token response matches to the user authentication token response value, and regards the message of two dimension code authentication success as the two dimension code authentication result; otherwise, determines that the mobile terminal token response value does not match to the authentication response value, and regards the message of two dimension code authentication failure as the two dimension code authentication result.

When the mobile terminal token response value obtained is User 2 $1^{st}$ mobile terminal token response value information, the authentication server generates a User 2 $1^{st}$ authentication token response value according to the challenge value, User 2 $1^{st}$ authentication token seed and the dynamic factor through the algorithm same with a $2^{nd}$ preset algorithm, determines whether the User 2 $1^{st}$ mobile terminal token response value information matches to User 2 $1^{st}$ authentication token response value, if yes, then determines that the user mobile terminal token response matches to the user authentication token response value, and regards the message of two dimension code authentication success as the two dimension code authentication result; otherwise, determines that the mobile terminal token response value does not match to the authentication response value, and regards the message of two dimension code authentication failure as the two dimension code authentication result.

In Embodiment 2, Step 213 can further be substituted by Step 213'; correspondingly, Step 214 can substituted by Step 214';

Step 213': the mobile terminal token sends the two dimension code identification information, the user mobile terminal token serial numbers, and the user mobile terminal token response value to the authentication server.

Especially, the mobile terminal token sends the two dimension code identification information, the user mobile terminal token serial numbers, and the user mobile terminal token response value to the authentication server according to the authentication server address present in the two dimension code information.

Step 214': the authentication server determines that whether the corresponding user mobile terminal token information matches to the username information according to the user mobile terminal token information, if yes, obtains the corresponding user authentication token information according to the user mobile terminal token information, obtains the user authentication token response value according to the user authentication token information and the challenge value, obtains a two dimension code authentication result according to the user authentication token response value, user mobile terminal token response value, and the username information, deletes the stored username information and the challenge value which are corresponding to the two dimension code information; otherwise, regards the message of two dimension code authentication failure as the two dimension code authentication result.

Specifically, the authentication server obtains the user mobile terminal token response value, the user mobile terminal token serial numbers and the two dimension code identification information, obtains the stored challenge value and username information which are corresponding to the two dimension code identification information according to the two dimension code identification information, determines whether the user mobile terminal token serial numbers matches to the username information, if yes, obtains the corresponding user authentication token seed according to the user mobile terminal token serial numbers, calculates the user authentication token seed, challenge value and the dynamic factor to generate a user authentication token response value through the algorithm same with a $2^{nd}$ preset algorithm, obtains a two dimension code authentication result according to the user authentication token response value, user mobile terminal response value and the username information, deletes the stored username information and challenge value which are corresponding to the two dimension code; otherwise, regards the message of two dimension code authentication failure as the two dimension code authentication result.

Step 215: after receiving the request for authenticating a two dimension code, the authentication sends the two dimension code authentication result to the application server;

In Embodiment 2, after Step 209 and before Step 215, the method further includes:

Step c1: the client side generates a request for authenticating a two dimension code according to the two dimension code image information;

specifically, the client side obtains the two dimension code identification information according to the two dimension code image information, generates a request for authenticating a two dimension code including the two dimension code identification information.

It should be noted that, the client side can generates the request for authenticating a two dimension code according to the two dimension code image information when receiving the trigger of a user; and can also generates the request for authenticating a two dimension code when the client side displays the two dimension code image on the interface according to the two dimension code image information in Step 209.

Step c2: the client side sends the request for authenticating a two dimension code to the application server;

Step c3: the application server sends the request for authenticating a two dimension code to the authentication server.

Step 215 specifically includes:

the authentication server determines whether a legitimate request for authenticating a two dimension code obtained in the preset time, if yes, then the authentication server sends the two dimension code authentication result to the application server; otherwise, regards the message of two dimension code authentication failure as the two dimension code authentication result, sends the two dimension code authentication result to the application server.

Especially, in the preset time, the authentication server determines whether the obtained request for authenticating a two dimension code sent from the mobile terminal token contains the two dimension code identification information, if yes, determining that the two dimension code identification information is legitimate; otherwise, determining that no legitimate two dimension code identification information is received, and regards the message of the two dimension code authentication failure as the two dimension code authentication result.

In Embodiment 2, preferably, the preset time is 60 s.

Step 216: the application server sends the two dimension code authentication result to the client side;

Step 217: the client side executes corresponding operation according to the two dimension code authentication result.

in Step 217, the client side can also waits for the two dimension code authentication result in the preset time, if the two dimension code authentication result obtained, the executes the corresponding operation according to the two dimension code authentication result; otherwise, output an accessing failure message.

In Embodiment 2, when the user accessing request is a user logging accessing request, the client side displays the user logging result according to the two dimension code authentication result, if the message of two dimension code authentication success obtained, then skips to the application server interface after user logging, if the message of fell two dimension code authentication failure obtained, then output the message of user logging failure.

In Embodiment 2, Step 205 can further specifically include:

after receiving the request for obtaining a two dimension code, the authentication server generates a challenge value and two dimension code identification information, obtains the two dimension code information including the challenge value and two dimension code identification information, establishes a corresponding relationship of the two dimension code identification information with the challenge value and the username information respectively, and stores the username information, the challenge value and the two dimension code identification information.

Correspondingly, Step 211 specifically includes: the mobile terminal token obtains the challenge value in the two dimension code information.

Correspondingly, Step 213 specifically includes: the mobile terminal token sends the user mobile terminal token authentication information including the two dimension code identification information and the user mobile terminal token response value to the authentication server according to the preset authentication server address.

It should be noted that, in Embodiment 2, Step 205 can further specifically include: after receiving the request for obtaining a two dimension code, the authentication server generates a challenge value and two dimension code identification information, obtains the user authentication token information according to the username information, generates the two dimension code including the two dimension code identification information and the user authentication token information according to the two dimension code identification information and the user authentication token information, establishes a corresponding relationship of the two dimension code identification information with the challenge value and the username information, stores the username information, the challenge value and the two dimension code identification information.

Correspondingly, after Step 210 and before Step 212, the method can further include: obtaining the user mobile terminal token information of the mobile terminal token according to the user authentication token information in the two dimension code information.

correspondingly, after obtaining the user mobile terminal token information of the mobile terminal token side according to the user authentication token information in the two dimension code information, before Step 212, the method further includes: the mobile terminal token determines that whether user mobile terminal token information of the mobile terminal token obtained, if yes, obtains the user mobile terminal token response value according to the according to the user mobile terminal token information of the mobile terminal token and the challenge value; otherwise, reports an error and exits.

Also should be noted that, in Embodiment 2, the mobile terminal token can communicate with the authentication server according to the preset authentication server address, or when the two dimension code information includes the authentication server address, communicates with the authentication server according to the authentication server address in the two dimension code obtained.

Also, it should be noted that, in Embodiment 2, the two dimension code at least includes the two dimension code identification information, and can further include at least one of the authentication server, the challenge value, the user mobile terminal token serial numbers.

Embodiment 3

Embodiment 3 provides a security authenticating method of a two dimension code, the specific steps are as below:

Step 301: the authentication server receives a request for obtaining a two dimension code from the application server, generates a challenge value and two dimension code information including two dimension code identification information, establishes a corresponding relationship with the challenge value according to the two dimension code identification information, stores the challenge value and the two dimension code identification information, sends the two dimension code information to the application server, the two dimension code information is configured to display a two dimension code image;

Step 302: the authentication server receives the two dimension code identification information, user mobile terminal token response value, and the user mobile terminal token information from the mobile terminal token, obtains the user authentication token information and the username information which are corresponding to the user mobile terminal token information according to the user mobile terminal token information, obtains the challenge value corresponding to the two dimension code information according to the two dimension code identification information, generates a user authentication token response value according to the user authentication token information and the challenge value, obtains the two dimension code authentication result according to the user authentication token response value, the user mobile terminal token response value and the username information;

Step 303: after receiving the request for authenticating a two dimension code from the application server, the authentication server sends the two dimension code authentication result to the application server;

specifically, after receiving the request for authenticating a two dimension code from the application server, the authentication server determines the request for authenticating a two dimension code matching to the two dimension code identification information obtained, if yes, returns the two dimension code authentication result to the application server; otherwise, regards the message of two dimension code authentication failure as the two dimension code authentication result, returns the two dimension code authentication result to the application server.

In Embodiment 3, after Step 301, the method further includes:

the authentication server receives the request for authenticating a two dimension code from the application server.

In Embodiment 3, after the authentication server obtains the challenge value corresponding to the two dimension code information according to the two dimension code identification information, before generates the user authentication token response value according to the user authentication token information and the challenge value, the method further includes:

the authentication server determines that whether the challenge value corresponding to the two dimension code information obtained, if yes, then continues; otherwise, regards the message of two dimension code authentication failure as the two dimension code authentication result.

After the authentication server receives the request for obtaining a two dimension code from the application server, or after the authentication server obtains the challenge value corresponding to the two dimension code information, the method further includes, deleting the stored two dimension code identification information and the challenge value.

In Embodiment 3, before Step 302, the method can further include:

the authentication server receives the request for obtaining a challenge value including the two dimension code identification information from the mobile terminal token, obtains the challenge value corresponding to the two dimension code information according to the two dimension code identification information, and returns the challenge value to the mobile terminal token.

In Embodiment 3, the two dimension code information includes two dimension code identification information, the two dimension code identification information is the identification information of the two dimension code information, the two dimension code information can further include the challenge value;

the authentication server generates the two dimension code information including the two dimension code identification information and the challenge value, specifically includes:

the authentication server generates the two dimension code identification information, generates the two dimension code information including the two dimension code identification information and the challenge value according to the two dimension code identification information and the challenge value.

In Embodiment 3, the two dimension code information further includes: an authentication server address;

the authentication server generates the two dimension code information including the two dimension code identification information and the authentication server address, specifically includes:

the authentication server generates the two dimension code identification information, generates the two dimension code information including the two dimension code identification information and the authentication server address according to the two dimension code identification information and the authentication server address; and the authentication server receives the two dimension code identification information, user mobile terminal token response value and the user mobile terminal token information, specifically includes:

the authentication server receives the two dimension code identification information, user mobile terminal token response value and the user mobile terminal token information according to the authentication server address.

More specifically, the authentication server receives the two dimension code identification information, user mobile terminal token response value and the user mobile terminal token information through the communication channel to the authentication server established by the mobile terminal token according to the authentication server address.

In Embodiment 3, the request for obtaining a two dimension code further includes: an application identification;

after the authentication server obtains the request for obtaining a two dimension code, the method further includes: obtains an application name according to the application identification, establishes a corresponding relationship with the application name according to the two dimension code identification information, stores the application name;

after Step 301, the method further includes, after the authentication server receives the request for obtaining a challenge value and username information which includes the two dimension code identification information and the user application information form the mobile terminal token, obtains the challenge value and the application name which are corresponding to the two dimension code identification information, obtains the username information corresponding to the user mobile terminal token information, returns the challenge value, username information, and the application name to the mobile terminal token.

In Embodiment 3, after Step 301, the method further includes:

the mobile terminal token obtains the two dimension code information including the two-dimensional bar identification information according to the two dimension code image, obtains the challenge value according to the two dimension code information, generates the user mobile terminal token response value according to the user mobile terminal token information and the challenge value at the mobile terminal token, sends the two dimension code identification information, the mobile terminal token response value and the user mobile terminal token information to the authentication server.

In Embodiment 3, obtaining, by the mobile terminal token, the challenge value according to the two dimension code information specifically includes:

the mobile terminal token generates a request for obtaining a challenge value which includes the two dimension code identification information, sends the request for obtaining a challenge value to the authentication server and obtains the challenge value corresponding to the two dimension code identification information from the authentication server.

In Embodiment 3, the two dimension code information includes the two dimension code information includes the two dimension code identification information; when the two dimension code information further includes the challenge value, obtaining the challenge value according to the two dimension code information by the mobile terminal token further includes that: the mobile terminal token obtains the challenge value in the two dimension code information according to the two-dimensional bard cord information.

In Embodiment 3, sending the two dimension code identification information, the user mobile terminal token response value and the user mobile terminal token information by the mobile terminal token to the authentication server specifically includes that:

the mobile terminal token sends the two-dimensional identification information, the user mobile terminal token response value and the user mobile terminal token information to the authentication server according to a preset authentication server address.

In Embodiment 3, the two dimension code information includes the two dimension code identification information; when the two dimension code information further includes an authentication server address, sending the two dimension code identification information, the user mobile terminal token response value and the user mobile terminal token information by the mobile terminal token to the authentication server specifically includes that:

sending the two dimension code identification information, the user mobile terminal token response value and the user mobile terminal token information by the mobile terminal token to the authentication server according to the authentication server address.

In Embodiment 3, before the mobile terminal token generates the mobile terminal token response value according to the user mobile terminal token information and the challenge value, the method further includes:

obtaining an application name according to the two dimension code information;

obtaining the username information according to the user mobile terminal token information;

obtaining, by the mobile terminal token, the challenge value according to the two dimension code information, obtaining the application name according to the two dimension code information; obtaining the username information according to the user mobile terminal token information can specifically includes that:

the mobile terminal token sends a request for obtaining a challenge value and user application information, which includes the two-dimensional identification information and the user mobile terminal token information, to the authentication server, obtains the username information corresponding to the user mobile terminal token information, the application name and the challenge value which are corresponding to the two dimension code identification information to the authentication server, after obtaining the username information and the application name, the method further includes displaying the username information and the application name, waiting for obtaining confirming information;

generating the user mobile terminal token response value according to the user mobile terminal token information and the challenge value by the mobile terminal token specifically includes that:

after obtaining the confirming information and the challenge value, the mobile terminal token generates the user mobile terminal token response value according to the user mobile terminal token information of the mobile terminal token and the challenge value.

In Embodiment 3, the mobile terminal token has function of collecting two dimension code.

In Embodiment 3, before Step 301, the method further includes that:

the application server receives a user accessing request from the client side and generates a request for obtaining two dimension code; and after the authentication server sends the two dimension code information to the application server, the method further includes that:

the application server obtains the two dimension code image information according to the two dimension code information, sends the two dimension code image information to the client side, the client side displays the two dimension code image according to the two dimension code image information;

after Step 301, before the authentication server receives the two dimension code authenticating request from the application server, the method further includes that:

the application server receives the two dimension code authenticating request from the client side;

after the authentication server sends the two dimension code authentication result to the application server, the method further includes that:

the application server returns a user accessing result to the client side according to the two dimension code authentication result.

It should be noted that, in Embodiment 3, the two dimension code information at least includes the two-dimensional bar-code identification information, and can further includes at least one of the authentication server address, the challenge value and a user mobile terminal token serial number.

Embodiment 4

Embodiment 4 of the present invention provides a security authenticating method of a two dimension code, the specific steps are as follows:

Step 401, the authentication server receives a request for obtaining two dimension code, which includes username information, from the application server, generates a challenge value and two dimension code information including the two dimension code identification information, builds corresponding relationship with the username information, the challenge value according to the two dimension code identification information, stores the two dimension code identification information, the user name information and the challenge value, returns the two dimension code information to the application server, the two dimension code information is for displaying the two dimension code image;

Step 402, the authentication server receives two-dimensional identification information and a user mobile terminal token response value from the mobile terminal token, obtains the challenge value corresponding to the two dimension code identification information and the username information according to the two dimension code identification information, obtains the user authentication token information according to the username information, generates the user authentication token response value according to the user authentication token information and the challenge value, obtains a two-dimensional authenticating result according to the user authentication token response value, the user mobile terminal token response value and the username information;

Step 403, after receiving the two dimension code authenticating request from the application server, the authentication server sends the two dimension code authentication result to the application server;

specifically, after receiving the two dimension code authenticating request from the application server, the authentication server determines whether obtains the two dimension code authenticating request matched the two dimension code identification information, if yes, returns the two dimension code authentication result to the application server; otherwise, takes failed two dimension code authentication information as the two dimension code authentication result, return the two dimension code authentication result to the application server.

After Step 401, the method further includes:

the authentication server receives the two dimension code authentication request from the application server.

In Embodiment 4, after the authentication server obtains the challenge value corresponding to the two dimension code information according to the two dimension code identification information and before generating the user authentication token response value according to the user authentication information and the challenge value, the method further includes that:

the authentication server determines whether obtains the challenge value corresponding to the two dimension code information, if yes, keeps on the procedure; otherwise, takes the failed two dimension code authentication information as the two dimension code authentication result.

After the authentication server receives the request for obtaining two dimension code from the server or after the authentication server obtains the challenge value corresponding to the two dimension code information, the method further includes clearing the stored two dimension code identification information and the challenge value.

In Embodiment 4, before Step 402, the method further includes that:

the authentication server receives the request for obtaining a challenge value which includes the two dimension code identification information from the mobile terminal token, obtains the challenge value corresponding to the two dimension code identification information according to the two dimension code identification information, returns the challenge value to the mobile terminal token.

In Embodiment 4, the two dimension code information includes the two dimension code identification information, the two dimension code information can further include the challenge value;

generating, by the authentication server, two dimension code information including the two dimension code identification information and the challenge value specifically includes:

generating, by the authentication server, the two dimension code identification information, generating the two dimension code information including the two dimension code identification information and the challenge value according to the two dimension code identification information and the challenge value.

In Embodiment 4, the two dimension code information includes the two dimension code identification information; the two dimension code information further includes an authentication server address;

generating, by the authentication server, the two dimension code information including the two dimension code identification information and the authentication server address specifically includes:

generating, by the authentication server, the two dimension code identification, generating the two dimension code information including the two dimension code identification information and the authentication server address according to the two dimension code identification information and the authentication server address of the authentication server;

the authentication server receives the two dimension code identification information and the user mobile terminal token response value from the mobile terminal token specifically includes: and receiving, by the authentication server, the two dimension code identification information and the user mobile terminal token response value from the mobile terminal token according to the authentication server address. More specifically, the authentications server receives the two dimension code identification information and the user mobile terminal token response value from the mobile terminal token via the mobile terminal token according to the authentication server address and a communication channel built by the authentication server.

In Embodiment 4, the two dimension code information includes the two dimension code identification information, the two dimension code identification information is identification information of two dimension code information. The two dimension code information further includes the user authentication token information;

generating, by the authentication server, the two dimension code information including the two dimension code identification information and the user authentication token information specifically includes:

generating, by the authentication server, the two dimension code identification information, obtaining the user authentication token information according to the username information, generating the two-dimensional cod information including the two dimension code identification information and the user authentication token information.

In Embodiment 4, the request for obtaining two dimension code further includes: an application identification;

after receiving, by the authentication server, the request for obtaining two dimension code from the application server, Step 401 further includes: obtaining the application name according to the application identification, building corresponding relation according to the two dimension code identification information and the application name and storing the application name.

after Step 401, the method further includes: after receiving the request for obtaining the challenge value and the user application information including the two dimension code identification information from the mobile terminal token, obtaining the challenge value, the username information and the application name which are corresponding to the two dimension code identification information, returning the challenge value, the user name information and the application name to the mobile terminal token.

In Embodiment 4, after Step 401, the method further includes that:

the mobile terminal token obtains two dimension code information including the two dimension code information according to the two dimension code image, obtaining the challenge value according to the two dimensional cod information, generating the user mobile terminal token response value according to the user mobile terminal token information of the mobile terminal token and the challenge value and sending the tow-dimensional code identification information and the user mobile terminal token response value to the authentication server.

In Embodiment 4, obtaining, by the mobile terminal token, the challenge value according to the two dimension code information specifically includes that:

the mobile terminal token generates a request for obtaining a challenge value which includes the two dimensional code identification information, sends the request for obtaining the challenge value to the authentication server, obtains the challenge value corresponding to the two-dimensional identification information from the authentication server.

In Embodiment 4, the two dimension code information includes the two-dimensional identification information, when the two dimension code information further includes the challenge value, obtaining, by the mobile terminal token, the challenge value according to the two dimensional code information further includes that the mobile terminal token obtains the two dimension code information challenge value according to the two dimension code information.

In Embodiment 4, sending, by the mobile terminal token, the two dimension code identification information and the user mobile terminal token response value to the authentication server specifically includes that:

the mobile terminal token sends the two-dimensional cod identification information and the user mobile terminal token response value to the authentication server according to the preset authentication server address.

In Embodiment 4, the two dimension code information includes two-dimensional identification information; when the two dimension code information further includes the authentication server address, sending, by the mobile terminal token, the two-dimensional identification information and the user mobile terminal token response value to the authentication server specifically includes that:

the mobile terminal token sends the two dimension code identification information and the user mobile terminal token response value to the authentication server according to the authentication server address in the two dimension code information.

In Embodiment 4, before generating, by the mobile terminal token, the user mobile terminal token response value according to the user mobile terminal token information and the challenge value, the method further includes:

obtaining the application name according to the two dimension code information;

obtaining the user name information according to the user mobile terminal token information;

obtaining, by the mobile terminal token, the challenge value according to the two dimension code information, obtaining the application name according to the two dimension code information; obtaining the user name information according to the user mobile terminal token information can specifically includes: obtaining the challenge value, the application name and the user name information according to the two dimension code information and the user mobile terminal token information;

obtaining the challenge value, the application name and the user name information according to the two dimension code information and the user mobile terminal token information can specifically includes that:

the mobile terminal token sends the request for obtaining the challenge value and the user application information, which includes the two dimension code identification information and the user mobile terminal token information, to the authentication server, obtains the username information corresponding to the user mobile terminal token information and the application name and the challenge value which are corresponding to the two dimension code identification information from the authentication server.

After receiving the username information and the application name, the method further includes: displaying the username information and the application name and waiting for obtaining confirming information;

generating, by the mobile terminal token, the user mobile terminal token response value according to the user mobile terminal token information and the challenge value specifically includes that:

after obtaining the confirming information and the challenge value, the mobile terminal token generates the user mobile terminal token response value according to the user mobile terminal token information and the challenge value of the mobile terminal token.

In Embodiment 4, the two dimension code information includes the two dimension code identification information, when the two dimension code information further includes user authentication token information, after the mobile terminal token obtains the two dimension code information including the two dimension code identification information and the user authentication token information according to the two dimension code information, before generating the user mobile terminal token response value according to the user mobile terminal token information and the challenge value of the mobile terminal token, the method further includes:

obtaining the mobile terminal token information of the mobile terminal token according to the user authentication token information in the two dimension code information.

In Embodiment 4, before Step 401, the method further includes that:

the application server receives a user accessing request including the username information from the client side, determines whether the user accessing request is legitimate, if yes, generating the two dimension code obtaining request including the username information according to the user accessing request, sends the user two dimension code information obtaining request to the authentication server; otherwise, return error information to the client side.

After the authentication server sends the two dimension code information to the application server, the method further includes that:

the application server obtains the two-dimensional image information according to the two dimension code information, sends the two-dimensional image information to the client side, the client side displays the two-dimensional image according to the two dimension code image information;

after Step 401, before the authentication server receives the two dimension code authentication request from the authentication server, the method further includes that:

the application server receives the two dimension code authentication request from the client side;

after the authentication server sends a two dimension code authentication result to the application server, the method further includes that:

the application server returns a user accessing result to the client side according to the two dimension code authentication result to the client side.

It should be noted that, in Embodiment 4, the two dimension code information at least includes the two dimension code identification information, can also includes at least of the authentication server address, the challenge value and the user mobile terminal token serial number.

The invention claimed is:

1. A security authenticating method of two dimension code, which can be applied in a system comprising a token side, a client side, an application server and an authentication server, wherein said method comprises the following steps:
    S1) receiving, by the application server, a user accessing request through the client side, generating a request for obtaining the two dimension code, and sending the request for obtaining the two dimension code to the authentication server;
    S2) generating, by the authentication server, a challenge value, generating the two dimension code information, which comprises two dimension code identification information, establishing a corresponding relationship with the challenge value according to the two dimension code identification information, storing the challenge value and the two dimension code identification information, and sending the two-dimensional bar code information to the application server;
    S3) obtaining, by the application server, a two dimension code image information according to the two dimension code information, sending the two dimension code image information to the client side, and displaying, by the client side, a two dimension code image according to the two dimension code image information;
    S4) obtaining, by a mobile terminal token, the two dimension code image information according to the two dimension code image, obtaining the two dimension code information which comprises two dimension code identification information according to the two dimension code image information, obtaining the challenge value according to the two dimension code information, generating a user mobile terminal token response value according to the user mobile terminal token information of the mobile terminal token and the challenge value, sending the two dimension code identification information, the user mobile terminal token response value and the user mobile terminal token information to the authentication server;
    S5) obtaining, by the authentication server, the corresponding user authentication token information and username information according to the user mobile terminal token information, obtaining the challenge value corresponding to the two dimension code information according to the two dimension code identification information, generating a user authentication token response value according to the user authentication token information and the challenge value, and obtaining a two dimension code authentication result according to the user authentication token response value, the user mobile terminal token response value and the username information;
    S6) sending, by the authentication server, the result of the two dimension code authentication to the application server after receiving a request for authenticating the two dimension code sent from the application server; and
    S7) returning, by the application server, a user accessing result to the client side according to the result of the two dimension code authentication;
    after the Step 3 and before Step 6, the method further comprises:
    receiving, by the application server, a request for authenticating two dimensional code through the client side, and sending the request for authenticating the two dimension code to the authentication server.

2. The method of claim 1, wherein the two dimension code information further comprises the challenge value;
    generating the two dimension code information specifically comprises: generating, by the authentication server, the two dimension code identification information, and generating the two dimension code information which comprises the two dimension code identification information and the challenge value according to the two dimension code identification information and the challenge value; and
    obtaining the challenge value according to the two dimension code information specifically comprises: obtaining, by the mobile terminal token, the challenge value in the two dimension code.

3. The method of claim 1, wherein obtaining the challenge value according to the two dimension code information specifically comprises the following steps:
    P1) generating, by the mobile terminal token, a request for obtaining the challenge value, which comprises the two dimension code identification information, and sending the request for obtaining the challenge value to the authentication server; and
    P2) obtaining, by the authentication server, a stored challenge value corresponding to the two dimension code identification information according to the request for obtaining the challenge value, and returning the challenge value to the mobile terminal token.

4. The method of claim 1, wherein, in Step 5, after obtaining the challenge value corresponding to the two dimension code according to the two dimension code identification information, before generating a user authentication token response value according to the user authentication token information and the challenge value, the method further comprises: determining, by the authentication server, whether the challenge value corresponding to the two dimension code information is obtained, if yes, executing generating the user authentication token response value according to the user authentication token information and the challenge value and continuing; otherwise, regarding the information of two dimension code authentication failure as the two dimension code authentication result and executing Step 6;

when receiving, by the authentication server, the request for obtaining the two dimension code, or after obtaining, by the authentication server, the challenge value corresponding to the two dimension code, the method further comprises: deleting, by the authentication server, the two dimension code identification information and the challenge value which have been stored.

5. The method of claim 1, wherein, sending the two dimension code identification information, the user mobile terminal token response value, and the user mobile terminal token information to the authentication server, specifically comprises: sending, by the mobile terminal token, the two dimension code identification information, the user mobile terminal token response value and the user mobile terminal token information to the authentication server according to the preset authentication server address.

6. The method of claim 1, wherein, the two dimension code information further comprises an authentication server address; and generating the two dimension code information, specifically comprises: generating, by the authentication server, the two dimension code identification information, and generating the two dimension code information comprising the two dimension code identification information and the authentication server address according to the two dimension code identification information and the authentication server address itself.

7. The method of claim 1, wherein, the Step 6 specifically comprises: after receiving, by the authentication server, the request for authenticating the two dimension code, determining, by the authentication server, whether the request for authenticating the two dimension code matched the two dimension code identification information is obtained, if yes, sending the result of the two dimension code authentication to the application server; otherwise, regarding the information of the two dimension code authentication failure as the two dimension code authentication result, and sending the two dimension code authentication result to the application server.

8. The method of claim 1, wherein, the request for obtaining the two dimension code comprises an application identification;

Step 2 further comprises: obtaining, by the authentication server, an application name according to the application identification, establishing a corresponding relationship according to the two dimension code identification information and the application name, and storing the application name;

in Step 4, before generating a user mobile terminal token response value according to the user mobile terminal token information of the mobile terminal token and the challenge value, the method further comprises: obtaining the application name corresponding to the two dimension code information according to the two dimension code information, and obtaining the username information corresponding to the user mobile terminal token information according to the user mobile terminal token information of the mobile terminal token;

after obtaining, by the mobile terminal token, the username information corresponding to the user mobile terminal token information, the application name corresponding to the two dimension code information, and the challenge value, the method further comprises: displaying the username information and the application name, and waiting for obtaining the authentication information; and generating the user mobile terminal token response value according to the user mobile terminal token information and the challenge value, specifically comprises: after obtaining, by the mobile terminal token, the authentication information and the challenge value, generating the user mobile terminal token response value according to the user mobile terminal token information of the mobile terminal token and the challenge value.

9. A security authenticating method of two dimension code, which can be applied in a system comprising a token side, a client side, an application server and an authentication server, wherein the method comprises the following steps:

A1) receiving, by the application server, a user accessing request comprising a username information through the client side, determining whether the user accessing request is legitimate, if yes, generating a request for obtaining the two dimension code comprising the username information according to the user accessing request, and sending the requesting for obtaining the two dimension code to the authentication server; otherwise, returning an error message to the client side;

A2) obtaining, by the authentication server, the username information according to the request for obtaining the two dimension code, generating a challenge value, generating the two dimension code information, in which the two dimension code information comprises two dimension code identification information, establishing a corresponding relationship with the username information and the challenge value respectively according to two dimension code identification information, storing the two dimension code identification information, the username information and the challenge value, and sending the two dimension code information to the application server;

A3) obtaining, by the application server, two dimension code image information according to the two dimension code information, sending the two dimension code image information to the client side, displaying, by the client side, a two dimension code image according to the two dimension code image information;

A4) obtaining, by the mobile terminal token, the two dimension code image information according to the two dimension code image, obtaining the two dimension code information according to the two dimension code image information, in which the two dimension code information comprises the two dimension code identification information, obtaining the challenge value according to the two dimension code information, generating a user mobile terminal token response value according to user mobile terminal token information of the mobile terminal token and the challenge value, and sending the two dimension code identification information and the user mobile terminal token response value to the authentication server;

A5) obtaining, by the authentication server, the challenge value corresponding to the two-dimensional identification information and username information according to the two dimension code identification information, obtaining user authentication token information according to the username information, generating a user authentication token response value according to the user authentication token information and the challenge value, and obtaining the two dimension code authentication result according to the user authentication token response value, the user mobile terminal token response value, and the username information;

A6) receiving, by the authentication server, the request for authenticating the two dimension code sent from the application server, then sending the two dimension code authentication result to the application server; and A7) returning, by the application server, the user accessing result to the client side according to the two dimension code authentication result;

after the Step A3, and before the Step A6, the method further comprises:

receiving, by the application server, a request for the two dimension code authentication through the client side, and sending the request for the two dimension code authentication to the application server.

10. The method of claim 9, wherein, the two dimension code information further comprises the challenge value;

generating two dimension code information, specifically comprises: generating, by the authentication server, two dimension code identification information, generating two dimension code information comprising the two dimension code identification information and the challenge value according to the two dimension code identification information and the challenge value; and obtaining a challenge value according to the two dimension code information, specifically comprises: obtaining, by the mobile terminal token, the challenge value in the two dimension code information.

11. The method of claim 9, wherein, after obtaining the challenge value corresponding to the two-dimensional identification information and username information according to the two dimension code identification information of the Step A5, before generating the user authentication token response value according to the user authentication token information and the challenge value, the method further comprises: determining, by the authentication server, whether the challenge value and username information which are corresponding to the two dimension code identification information is obtained, if yes, continuing; otherwise, regarding the information of two dimension code authentication failure as the two dimension code authentication result, sending the two dimension code authentication result to the application server, then executing the Step A6; and when receiving, by the authentication server, the request for obtaining a two dimension code, or after obtaining, by the authentication server, the challenge value corresponding to the two dimension code identification information, the method further comprises: deleting the stored two dimension code identification information and the challenge value.

12. The method of claim 9, wherein, the two dimension code information further comprises an authentication server address; and generating the two dimension code information, specifically comprises: generating, by the authentication server, the two dimension code identification information and the authentication server address, generating the two dimension code information comprising the two dimension code identification information and the authentication server address according to the two dimension code identification information and the authentication server address.

13. The method of claim 9, wherein, the two dimension code information further comprises user authentication token information;

generating the two dimension code information, specifically comprises: generating, by the authentication server, the two dimension code identification information, obtaining the user authentication token information according to the username information, and generating the two dimension code that comprises the two dimension code identification information and the user authentication token information; and in the Step A4, after obtaining, by the mobile terminal token, two dimension code image information according to the two dimension code image, obtaining the two dimension code information according to the two dimension code image information, before generating the user mobile terminal token response value according to the user mobile terminal token information of the mobile terminal token and the challenge value, the method further comprises: obtaining, by the mobile terminal token, the user mobile terminal token information of the mobile terminal token according to the user authentication token information of the two dimension code information.

14. The method of claim 9, wherein, the request for obtaining a two dimension code further comprises application identification;

the Step A2 further comprises: obtaining, by the authentication server, the application name according to the application identification, establishing a corresponding relationship according to the two dimension code identification information and the application name, and storing the application name;

in the Step A4, before generating the user mobile terminal token response value according to the user mobile terminal token information of the mobile terminal token and the challenge value, the method further comprises: obtaining the username information and the application name which are corresponding to the two dimension code information according to the two dimension code information;

after obtaining, by the mobile terminal token, the username information and the application name which are corresponding to the two dimension code information, the method further comprises: displaying the username information and the application name, and waiting for obtaining the information of authentication; and generating the user mobile terminal token response value according to the user mobile terminal token information of the mobile terminal token and the challenge value, the method specifically comprises: after receiving, by the mobile terminal token, the authentication information and the challenge value, obtaining the user mobile terminal token response value according to the user mobile terminal token information of the mobile terminal token and the challenge value.

15. The method of claim 9, wherein, the Step A6 specifically comprises: after receiving, by the authentication server, the request for authenticating a two dimension code sent from the application server, determining whether the request for authenticating a two dimension code matches the two dimension code identification information is obtained in the preset time, if yes, sending the two dimension code authentication result to the application server; otherwise, regarding the information of the two dimension code authentication failure as the two dimension code authentication result, and sending the two dimension code authentication result to the application server.

16. The method of claim 9, wherein, in the Step A4, after obtaining the two dimension code information according to the two dimension code image information, before generating the user mobile terminal token response value according to the user mobile terminal token information of the mobile terminal token and the challenge value, the method further comprises: obtaining, by the mobile terminal token, the challenge value according to user mobile terminal token information;
obtaining a challenge value according to the two dimension code information, obtaining, by the mobile terminal token, a challenge value according to the user mobile terminal token information, specifically comprises:
Step C1': generating, by the mobile terminal token, a request for obtaining a challenge value that comprises the two dimension code identification information and the user mobile terminal token information, and sending the request for obtaining the challenge value to the authentication server; and
Step C2': obtaining, by the authentication server, the user mobile terminal token information according to the request for obtaining the challenge value, determining whether the user mobile terminal token information matches the username information, if yes, obtaining the challenge value corresponding to the two dimension code identification information, returning the challenge value to the mobile terminal token; otherwise, returning an error message to the mobile terminal token; and
generating the user mobile terminal token response value according to the user mobile terminal token information of the mobile terminal token and the challenge value, specifically comprises: after obtaining, by the mobile terminal token side, the challenge value, generating the user mobile terminal token response value according to the user mobile terminal token information of the mobile terminal token and the challenge value.

17. A security authenticating method of two dimension code, comprising the following steps:
T1) receiving, by the authentication server, a request for obtaining a two dimension code from the application server, generating a challenge value, generating two dimension code information comprising two dimension code identification information, generating corresponding relationship according to the two dimension code identification information and the challenge value, and storing the challenge value and the two dimension code identification information, sending the two dimension code information to the application server, in which the two dimension code information is configured to display a two dimension code image;
T2) receiving, by the authentication server, two dimension code identification information, user mobile terminal token response value, and user mobile terminal token information from the mobile terminal token, obtaining the user authentication token information and username information which are corresponding to the user mobile terminal token information according to the user mobile terminal token information, obtaining the challenge value corresponding to the two dimension code information according to the two dimension code identification information, generating the user authentication token response value according to the user authentication token information and the challenge value, and obtaining the two dimension code authentication result according to the user authentication token response value, user mobile terminal token response value, and the username information; and
T3) receiving, by the authentication server, the request for authenticating a two dimension code from the application server, then sending the two dimension code authentication result to the application server;
after Step T1, the method further comprises: receiving, by the authentication server, the request for authenticating the two dimension code from the application server.

18. The method of claim 17, wherein, the two dimension code further comprises the challenge value; and
generating the two dimension code information, specifically comprises: generating, by the authentication server, the two dimension code identification information, and generating the two dimension code information which comprises the two dimension code identification information and the challenge value according to the two dimension code identification information and the challenge value.

19. The method of claim 17, wherein, before the Step T2, the method further comprises: obtaining, by the authentication server, the request for obtaining a challenge value which comprises two dimension code identification information from the mobile terminal token, obtaining the challenge value corresponding to the two dimension code identification information according to the two dimension code identification information, and returning the challenge value to the mobile terminal token.

20. The method of claim 17, wherein, after obtaining the challenge value corresponding to the two dimension code information according to the two dimension code identification information, before generating a user authentication token response value according to the user authentication token information and the challenge value, the method further comprises: determining, by the authentication server, whether the challenge value corresponding to the two dimension code information is obtained, if yes, continuing; otherwise, regarding the information of the two dimension code authentication failure as the result of the two dimension code authentication; and
when receiving, by the authentication server, the request for obtaining a two dimension code from the application, or after obtaining, by the authentication server, the challenge value corresponding to the two dimension code information, the method further comprises: deleting the stored two dimension code identification information and the challenge value.

21. The method of claim 17, wherein, the two dimension code information further comprises an authentication server address;

generating the two dimension code information, specifically comprises: generating, by the authentication server, the two dimension code identification information, generating the two dimension code information which comprises the two dimension code identification information and the authentication server address according to the two dimension code identification information and the authentication server address itself; and receiving, by the authentication server, the two dimension code identification information, the user mobile terminal token response value, and the user mobile terminal token information from the mobile terminal token, specifically comprises: receiving, by the authentication server, the two dimension code identification information, the user mobile terminal token response value, and the user mobile terminal token information from the mobile terminal token according to the authentication server address.

22. The method of claim 17, wherein, after receiving, by the authentication server, the request for authenticating a two dimension code from the application server, sending the two dimension code authentication result to the application server, specifically comprises: after receiving, by the authentication server, the request for authenticating a two dimension code from the application server, determining, by the authentication server, whether the request for two dimension code authentication matches the two dimension code identification information is obtained, if yes, returning the two dimension code authentication result to the application server; otherwise, regarding the information of two dimension code authentication failure as the two dimension code authentication result, and returning the two dimension code authentication result to the application server.

23. The method of claim 17, wherein, the request for obtaining a two dimension code further comprises application identification;
in the Step T1, the method further comprises: obtaining, by the authentication server, an application name according to the application identification in the request for obtaining a two dimension code, establishing a corresponding relationship according to the two dimension code identification information and the application name, and storing the application name; and
after the Step T1, the method further comprises: after receiving, by the authentication server, the request for obtaining a challenge value and user application information, which comprises the two dimension code identification information and the user mobile terminal token information from the mobile terminal token, obtaining the challenge value and application name which are corresponding to the two dimension code identification information, obtaining username information corresponding to the user mobile terminal token information, and returning the challenge value, the username information, and the application name to the mobile terminal token.

24. The method of claim 17, wherein, after the Step T1, the method further comprises: obtaining, by the mobile terminal token, two dimension code information which comprises two dimension code identification information, obtaining a challenge value according to the two dimension code information, generating the user mobile terminal token response value according to the user mobile terminal token information of the user mobile terminal token side and the challenge value, and sending the authentication server the two dimension code identification information, the user mobile terminal token response value, and the user mobile terminal token information.

25. A security authenticating method of two dimension code, comprising the following steps:
W1) receiving, by a authentication server, a request for obtaining a two dimension code, which comprises username information from an application server, generating a challenge value, generating two dimension code information, in which the two dimension code information comprises two dimension code identification information, establishing a corresponding relationship with the username information and the challenge value respectively according to the two dimension code identification information, storing the two dimension code identification information, the username information and the challenge value, and returning the two dimension code information to the application server, in which the two dimension code information is configured to display a two dimension code image;
W2) receiving, by the authentication server, the two dimension code identification information and the user mobile terminal token response value from the mobile terminal token, obtaining the challenge value and the username information which are corresponding to the two dimension code identification information according to the two dimension code identification information, obtaining user authentication token information according to the username information, generating user authentication token response value according to the user authentication token information and the challenge value, and obtaining a two dimension code authentication result according to the user authentication token response value, the user mobile terminal token response value, and the username information; and
W3) after receiving, by the authentication server, the request for authenticating a two dimension code from the application server, sending the two dimension code authentication result to the application server;
after the Step W1, the method further comprises: receiving, by the authentication server, the request for authenticating a two dimension code from the application server.

26. The method of claim 25, wherein, the two dimension code information comprises the challenge value; and
generating the two dimension code information, specifically comprises: generating, by the authentication server, two dimension code identification information, and generating the two dimension code which comprises the two dimension code identification information and the challenge value according to the two dimension code identification information and the challenge value.

27. The method of claim 25, wherein, the two dimension code information further comprises an authentication server address;
generating the two dimension code information, specifically comprises: generating, by the authentication server, two dimension code identification information, and generating the two dimension code which comprises the two dimension code identification information and the authentication server address according to the two dimension code identification information and the authentication server address itself; and
receiving, by the authentication server, the two dimension code identification information and the user mobile terminal token response value from the mobile terminal token, specifically comprises: receiving, by the authentication server, the two dimension code identification information and the user mobile terminal token response value from the mobile terminal token according to the authentication server address.

28. The method of claim 25, wherein, the two dimension code information further comprises user authentication token information; and generating the two dimension code information, specifically comprises: generating, by the authentication server, two dimension code identification information, obtaining user authentication token information according to the username information, generating the two dimension code information which comprises the two dimension code identification information and the user authentication token information according to the two dimension code identification information and the user authentication token information.

29. The method of claim 25, wherein, the request for obtaining a two dimension code further comprises: an application identification;

in the Step W1, after receiving, by the authentication server, the request for obtaining from the application server, the method further comprises: obtaining an application name according to the application identification, establishing a corresponding relationship with the application name according to the two dimension code identification information, and storing the application name; and after the Step W1, the method further comprises, after receiving, by the authentication server, the request for obtaining a challenge value and username information comprising two dimension code identification information from the mobile terminal token, obtaining the challenge value, the username information and the application name which are corresponding to the two dimension code identification information, and returning the challenge value, the username information and the application name to the mobile terminal token.

30. The method of claim 25, wherein, after Step W1, the method further comprises: obtaining, by the mobile terminal token, two dimension code information according to two dimension code image, in which the two dimension code information comprises two dimension code identification information, obtaining a challenge value according to the two dimension code information, generating a user mobile terminal token response value according to the user mobile terminal token information of the mobile terminal token and the challenge value, and sending the two dimension code identification information and the user mobile terminal token response value to the authentication server.

* * * * *